E. C. ROBERTS.
Method of Preserving Fruit, &c.
No. 46,707.  Patented March 7, 1865.
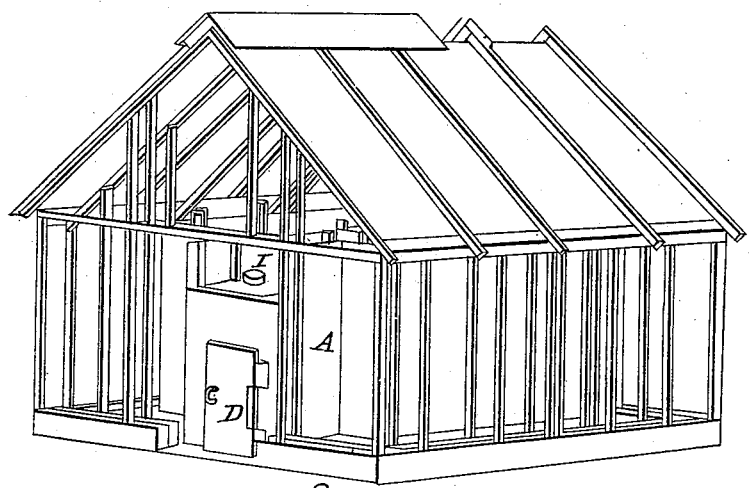
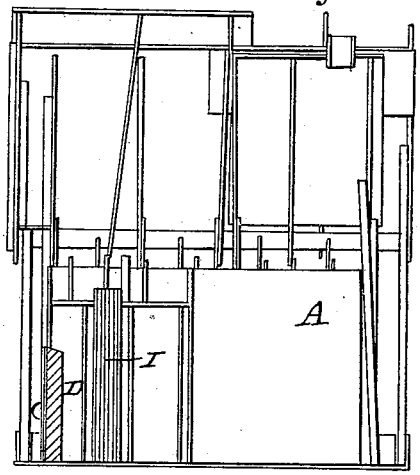
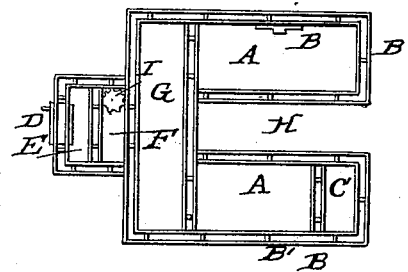
WITNESSES
INVENTOR

UNITED STATES PATENT OFFICE.

ESEK C. ROBERTS, OF SALEM, MICHIGAN.

IMPROVED METHOD OF PRESERVING FRUITS, &c.

Specification forming part of Letters Patent No. 46,707, dated March 7, 1865.

*To all whom it may concern:*

Be it known that I, ESEK C. ROBERTS, of Salem, in the county of Washtenaw and State of Michigan, have discovered a new and improved method of preserving fruit, vegetables, and other organic bodies liable to change or decay, in a perfect or normal state; and I do hereby declare that the following is a full and complete description thereof, reference being had to the accompanying drawings, making part of this specification, in which—

Figure 1 is a perspective view of an icehouse with my improvement attached, and Figs. 2 and 3 are detached views.

The nature of my invention or discovery consists in a process or method for keeping the temperature of organic substances liable to decay just above the freezing-point in winter and below the fermenting-point in summer, and at the same time free from all unnecessary or injurious moisture. This I accomplish by surrounding the substance to be preserved by one or more poor conductors of heat, which keeps it in a low degree of temperature, and at the same time acts as an absorbent to withdraw the moisture from the surrounding air before it reaches the fruit or substance to be preserved. For this purpose I use sawdust, charcoal, spent tan-bark, after it has been thoroughly dried, or other similar substances.

In order to keep the temperature of the substance to be preserved below the fermenting-point, I place around outside of these poor conductors layers of ice, or ice and snow, as hereinafter described.

In order to render this process more practical for private and commercial use, I construct one or more chambers, A, so that they can be used in a fruit or ice house. The size of these chambers should be made to correspond to the wants of the builder. The walls B of these chambers can be made of two by three inch scanting, covered on each side by boards, the space between which should be filled with the poor conducting material above mentioned, as shown at B'. The bottom and top of the chambers should be covered with the same material.

One or more of the chambers may be divided into several apartments for the separate storage of different fruits, as shown at C. The partitions forming these apartments may be made like the walls B, and filled in the same manner, and the doors leading from one department to another should be made double and packed in the same way.

In entering the chamber, three or four double doors should be passed through, each leading into a small room colder than the preceding one. These doors are shown at D E F in Fig. 3. The last before entering the fruit-chamber I call the "reception-room," (shown at G,) should have a length equal to all the chambers. There fruits and vegetables are first placed to cool, and afterward be put into the inner chambers, in barrels, boxes, or on shelves.

The chambers being thus completed and arranged, I place around and outside of them, except at the entrance, a layer of ice, carried up in the form of a wall, from six to ten feet wide, and from four to six feet higher than the tops of the chambers. In order to make the column or wall of ice more compact and to retain the moisture that originates from the melting of the ice in summer, I place snow just moist enough to pack well between the cakes of ice, as mortar is placed between bricks. If snow cannot be obtained, I fill up the crevices with pounded ice. There may be one or two feet of ice packed in the bottom of the chambers and covered with straw or sawdust. The space H between the chambers should be filled with ice laid in snow, or pounded ice, as before described, in the wall around the chambers and carried up to the same height as the walls of ice outside of the chambers. The object of raising the ice so much above the top of the chambers is to prevent them from settling lower than the tops of the chambers from loss by melting during the summer.

For the purpose of freeing the air that passes into the rooms of its moisture, I place a hollow metallic cylinder, I, in an upright position in the small room adjoining the reception-room. This cylinder may be made of zinc or other thin metal, and it is best that it should be corrugated, to give a large amount of surface. It should be one foot or more in diameter, and long enough for the lower end to rest on or near the ground, and the upper end to pass through the top of the room or chamber, so that it can be filled with ice at the upper end outside of the chamber. Its use will be needed only in warm weather. It should then be filled with ice and the upper end kept closed. By the contact of warm air containing moisture with its outer surface the moisture will be condensed, and thus the warm or moist air that enters at the door when opened will be freed from its superfluous moisture. A like condenser can be put in the reception-room or in any of the chambers. When these chambers are put in a fruit-house built expressly for that purpose, the sawdust or other poor conductor used outside of the ice should be carried up to the roof and entirely over the upper floor of the large room in which they are placed.

If the chambers are located in a common ice-house, the poor conductors should be used more abundantly than when placed in a house constructed expressly for the purpose, because in that case there is more danger of frost than moisture.

By placing the condenser in the center of the room, the currents of air will be from the walls toward the center of the room, and hence packages of fruit, &c., placed near the non-conducting walls have the atmosphere most free from moisture.

What claim as my improvement, and desire to secure by Letters Patent, is—

1. The herein-described construction of one or more chambers arranged within an ice-house or fruit-house, and surrounding the same, with a poor conductor of heat, as and for the purposes herein set forth.

2. One or more condensers constructed as described, and placed within the chamber, as and for the purpose specified.

ESEK C. ROBERTS.

Witnesses:
J. LEONARD,
E. F. OLDS.